(12) United States Patent
Mori

(10) Patent No.: US 11,782,876 B2
(45) Date of Patent: Oct. 10, 2023

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Ryuta Mori, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/034,943

(22) Filed: Sep. 28, 2020

(65) Prior Publication Data

US 2021/0103559 A1    Apr. 8, 2021

(30) Foreign Application Priority Data

Oct. 4, 2019 (JP) .................. 2019-184077

(51) Int. Cl.
| | |
|---|---|
| *G06F 17/00* | (2019.01) |
| *G06F 16/16* | (2019.01) |
| *G06F 3/0482* | (2013.01) |
| *G06F 9/48* | (2006.01) |
| *G06F 9/445* | (2018.01) |

(52) U.S. Cl.
CPC .......... *G06F 16/168* (2019.01); *G06F 3/0482* (2013.01); *G06F 9/445* (2013.01); *G06F 9/4843* (2013.01)

(58) Field of Classification Search
CPC .... G06F 16/168; G06F 9/4843; G06F 3/0482; G06F 9/445
USPC ................................................ 715/229, 764
See application file for complete search history.

(56) References Cited

U.S. PATENT DOCUMENTS

| | | | |
|---|---|---|---|
| 6,947,959 B1 * | 9/2005 | Gill ................ | G06Q 10/10 715/202 |
| 8,161,195 B2 * | 4/2012 | Matesan .......... | H04L 29/0854 709/248 |
| 8,717,599 B2 * | 5/2014 | Ochiai ............. | G03G 15/5075 358/1.15 |

(Continued)

FOREIGN PATENT DOCUMENTS

JP    2005-339114 A    12/2005

OTHER PUBLICATIONS

Kurniawan, How to Bulk Rename with Regular Expression (and Python), Published at Scriptedtask.com, 2018 (Year: 2018).*

*Primary Examiner* — Stephen S Hong
*Assistant Examiner* — Matthew J Ludwig
(74) *Attorney, Agent, or Firm* — Canon U.S.A., Inc. IP Division

(57) ABSTRACT

An information processing apparatus that has an automatic execution function to automatically execute a file which has been input to an automatic execution folder. The apparatus sets the automatic execution folder in which a process content has been set, and adds, in a case that a file is to be moved to the automatic execution folder by a first application, a piece of uniquely specifiable identification information to the file, and determines, in a case that the first application is to automatically execute a file held in the automatic execution folder, whether or not the identification information has been added to the file, and performs control to automatically execute the file in a case that the identification information has been added, and not to automatically execute the file in a case that the identification information has not been added.

6 Claims, 12 Drawing Sheets

(56) References Cited

U.S. PATENT DOCUMENTS

| | | | |
|---|---|---|---|
| 9,924,060 B2* | 3/2018 | Mori | H04N 1/00411 |
| 10,120,855 B2* | 11/2018 | Baldwin | G06F 40/186 |
| 10,394,794 B2* | 8/2019 | Raghavan | G06F 3/04847 |
| 10,824,986 B2* | 11/2020 | Karnik | G06Q 10/087 |
| 2002/0046338 A1* | 4/2002 | Ueda | G06Q 20/3674 |
| | | | 713/168 |
| 2002/0093582 A1* | 7/2002 | Aoki | H04N 1/32101 |
| | | | 348/333.05 |
| 2003/0058276 A1* | 3/2003 | Takiguchi | G06F 16/58 |
| | | | 715/764 |
| 2006/0174054 A1* | 8/2006 | Matsuki | H04N 1/32625 |
| | | | 711/100 |
| 2007/0083356 A1* | 4/2007 | Brunet | G06F 11/1451 |
| | | | 703/23 |
| 2007/0162271 A1* | 7/2007 | Brunet | G06F 11/1451 |
| | | | 703/25 |
| 2007/0168983 A1* | 7/2007 | Ishimura | G06F 11/3672 |
| | | | 717/124 |
| 2008/0243466 A1* | 10/2008 | Brunet | G06F 3/0664 |
| | | | 714/E11.12 |
| 2009/0087106 A1* | 4/2009 | Kawai | H04N 1/2166 |
| | | | 382/232 |
| 2009/0240703 A1* | 9/2009 | Yoshino | G06F 16/51 |
| 2011/0038005 A1* | 2/2011 | Ochiai | G03G 15/5075 |
| | | | 358/1.15 |
| 2011/0041140 A1* | 2/2011 | Harm | G06F 9/445 |
| | | | 719/318 |
| 2011/0093801 A1* | 4/2011 | Koyama | G06F 9/00 |
| | | | 715/763 |
| 2011/0125937 A1* | 5/2011 | Ito | H04N 1/00241 |
| | | | 710/36 |
| 2012/0210265 A1* | 8/2012 | Delia | G06F 8/34 |
| | | | 715/771 |
| 2013/0050730 A1* | 2/2013 | Soga | H04N 1/00244 |
| | | | 358/1.13 |
| 2013/0263106 A1* | 10/2013 | Fuse | G06F 8/65 |
| | | | 717/168 |
| 2014/0013253 A1* | 1/2014 | Kobayashi | G06F 3/0484 |
| | | | 715/764 |
| 2019/0332333 A1* | 10/2019 | Shogaki | G06F 3/1203 |
| 2020/0150906 A1* | 5/2020 | Nagao | G06F 3/1285 |

\* cited by examiner

FIG. 9

| DEFINITION ID | FOLDER NAME | PROCESS CONTENT | LOCATION | STATE |
|---|---|---|---|---|
| A000001 | FOR PRINTING | PRINTING | file:///C:/Users/abcde/FOR PRINTING | STARTED |
| A000002 | OCR PROCESSING | CONVERSION TO PDF | file:///C:/Users/abcde/fghkiki/.... | SUSPENDED |

FIG. 10

| DEFINITION ID | FOLDER NAME | PROCESS CONTENT | OTHER APPLICATION EXECUTION | LOCATION | STATE |
|---|---|---|---|---|---|
| A000001 | FOR PRINTING | PRINTING | 0 | file:///C:/Users/abcde/FOR PRINTING | STARTED |
| A000002 | OCR PROCESSING | CONVERSION TO PDF | 1 | file:///C:/Users/abcde/fghkiki/.... | SUSPENDED |

| USER ID | USERNAME | MACHINE NAME | LOCATION |
|---|---|---|---|
| U000001 | adfa002 | xxx.yyy.zzz.111 | file:///C:/Users/abcde/FOR PRINTING |
| U000002 | user003 | xxx.yyy.zzz.112 | file:///C:/Users/abcde/fghkiki/⋯ |

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

Conventionally, there is a function called automatic execution as a means for improving the efficiency of a work flow. In an automatic execution function, a folder called an automatic execution folder is designated, and the desired processing to be automatically executed is predefined in this folder. As a result, when a file has been input to the automatic execution folder, processing predefined for the automatic execution folder is automatically executed for the file by automatically detecting the file. A more specific example of an application that has an automatic execution function will be described here.

For example, the automatic execution function is set by a configuration dialogue of an automatic execution folder in a document management application. At this time, as setting contents, for example, a path of a folder to be the automatic execution target and process contents such as conversion to PDF (Portable Document Format), printing, and the like which are the process contents to be automatically executed are set. By making such settings, when a file is input to a folder set as an automatic execution folder, automatic execution processing will automatically execute processing based on the designated process contents by detecting the input file.

On the other hand, as a method of implementing the automatic execution function, there is also a method disclosed in Japanese Patent Laid-Open No. 2005-339114. Japanese Patent Laid-Open No. 2005-339114 discloses a system that implements an automatic execution function and manages the process contents of the automatic execution function in a database by linking each process content with a unique ID. It is disclosed that when a file with a unique ID is input to the automatic execution folder, the process content to be automatically executed is searched from the databased by using the unique ID as a key, and the automatic execution function is performed by using the found process content.

However, the following problem occurs when the automatic execution function is implemented by using the conventional technique disclosed in Japanese Patent Laid-Open No. 2005-339114. Note that a similar problem can also occur in the above-described example introduced as an example of an application. In Japanese Patent Laid-Open No. 2005-339114, when a file is input to the automatic execution folder, the automatic execution function is performed in accordance with the process content of the automatic execution function linked to the unique ID of the file. Thus, in a case in which file management is being performed in combination with a file management application, this file management application may neither have an automatic execution function such as that in the application of Japanese Patent Laid-Open No. 2005-339114 nor have a UI display function associated with the automatic execution function. Hence, even if an automatic execution folder is set by an application as that described in Japanese Patent Laid-Open No. 2005-339114, it cannot be discriminated from a normal folder and be displayed as an automatic execution folder on the file management application. Therefore, a user will not be able to discriminate whether a folder is a folder with the automatic execution setting on the file management application. As a result, since a folder with the automatic execution setting and a normal folder cannot be discriminated, a file with a unique ID may be erroneously moved to an automatic execution folder. Such a case is problematic in terms of security since printing processing or the like that is unintended by the user will be executed.

SUMMARY OF THE INVENTION

An aspect of the present invention is to eliminate the above-mentioned problem with conventional technology.

A feature of the present invention is to provide a technique that can prevent a file from being automatically executed even if the file is erroneously input to an automatic execution folder by an operation by a user.

One aspect of the present invention provides an information processing apparatus that has an automatic execution function to automatically execute a file which has been input to an automatic execution folder, comprising: at least one processor and at least one memory configured to function as: a setting unit that sets the automatic execution folder in which a process content has been set; an adding unit that adds, in a case that a file is to be moved to the automatic execution folder by a first application, a piece of uniquely specifiable identification information to the file; a determination unit that determines, in a case that the first application is to automatically execute a file held in the automatic execution folder, whether or not the identification information has been added to the file; and a control unit that performs control to automatically execute the file if the determination unit determines that the identification information has been added, and not to automatically execute the file if the determination unit determines that the identification information has not been added.

Another aspect of the present invention provides a method of controlling an information processing apparatus that has an automatic execution function to automatically execute a file which has been input to an automatic execution folder, the method comprising: setting the automatic execution folder in which a process content has been set; adding, in a case that a file is to be moved to the automatic execution folder by a first application, a piece of uniquely specifiable identification information to the file; determining, in a case that the first application is to automatically execute a file held in the automatic execution folder, whether or not the identification information has been added to the file; and performing control to automatically execute the file in a case that it is determined in the determining that the identification information has been added, and not to automatically execute the file if it is determined in the determining that the identification information has not been added.

Still another aspect of the present invention provides a non-transitory computer-readable storage medium storing a program for causing a processor to execute a method of controlling an information processing apparatus that has an automatic execution function to automatically execute a file which has been input to an automatic execution folder, the method comprising: setting the automatic execution folder in which a process content has been set; adding, in a case that a file is to be moved to the automatic execution folder by a first application, a piece of uniquely specifiable identification information to the file; determining, in a case that the first application is to automatically execute a file held in the automatic execution folder, whether or not the identification information has been added to the file; and performing control to automatically execute the file in a case that it is determined in the determining that the identification information has been added, and not to automatically execute the file if it is determined in the determining that the identification information has not been added.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 depicts a view showing an example of an automatic execution management table held by each client terminal according to the first embodiment;

FIG. 10 depicts a view showing an example of an automatic execution management table held by each client terminal according to the second embodiment;

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note in the embodiments to be described below, an information processing apparatus according to the present invention will be exemplified by a client terminal.

First Embodiment

Figure 1:
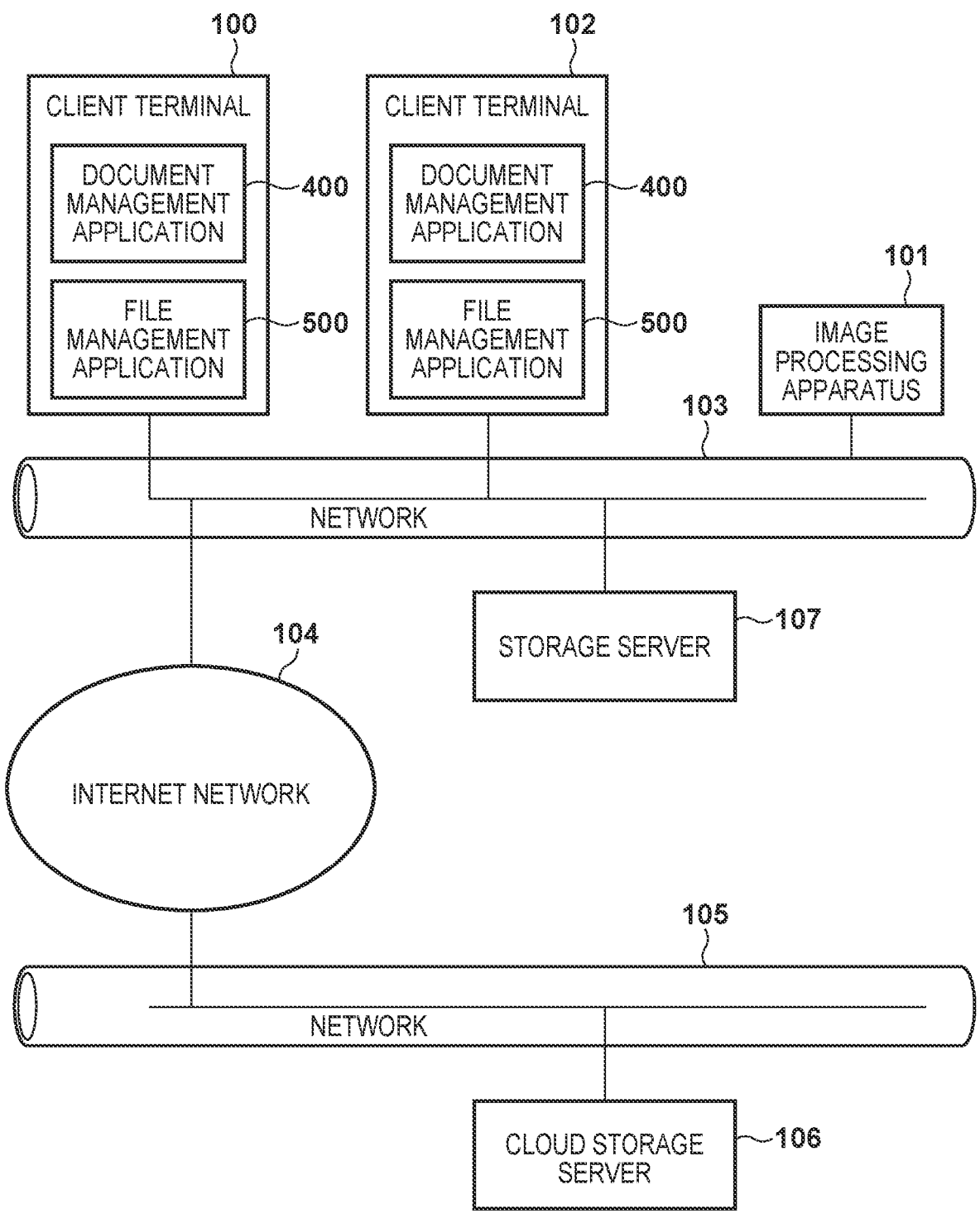
FIG. 1 depicts a view for explaining the arrangement of an image processing system according to the first embodiment of the present invention.

FIG. 1 depicts a view for explaining the arrangement of an image processing system according to the first embodiment of the present invention.

This image processing system includes, for example, client terminals 100 and 102 which are connected to a LAN (Local Area Network) 103 formed by Ethernet®, a wireless LAN, or the like, an image processing apparatus 101, and a storage server 107. A cloud storage server 106 is connected to a LAN 105 such as the Ethernet, the wireless LAN, or the like. These LAN 103 and LAN 105 are connected to an Internet network 104. As a result, the apparatuses connected to the respective networks of the LAN 103 and the LAN 105 can communicate with each other.

The client terminals 100 and 102 are PCs that are used by a user and can instruct the image processing apparatus 101 to perform printing and FAX transmission, and the like. The image processing apparatus 101 has a printer function, a FAX function, a copy function, a scanner function, a file transmission function, and the like. Note that a predetermined operating system (OS) as well as various kinds of applications (not shown) for executing specific functional processing operations are installed in each of the client terminals 100 and 102. In this case, specific functional processing operations include document processing, spreadsheet processing, presentation processing, image processing, graphic processing, and the like, and each application includes a unique data structure (file structure). Furthermore, each OS can refer to the identifier of each file to issue a print instruction to a corresponding application.

A document management application 400 and a file management application 500 for using the image processing apparatus 101 are installed in each of the client terminals 100 and 102. The document management application 400 has a function to issue an output instruction to the image processing apparatus 101 to perform printing, FAX transmission, and the like, a function to display a use state and an output job state of the image processing apparatus 101, and an automatic execution defining function. Also, the file management application 500 has a function for executing moving, copying, and replicating of a file between folders. The cloud storage server 106 and the storage server 107 provide, in cooperation with the document management application 400 and the file management application 500 executed in each client terminal, a storage function that can perform referencing, storing, editing, deleting, sharing and the like of a document.

Figure 2:
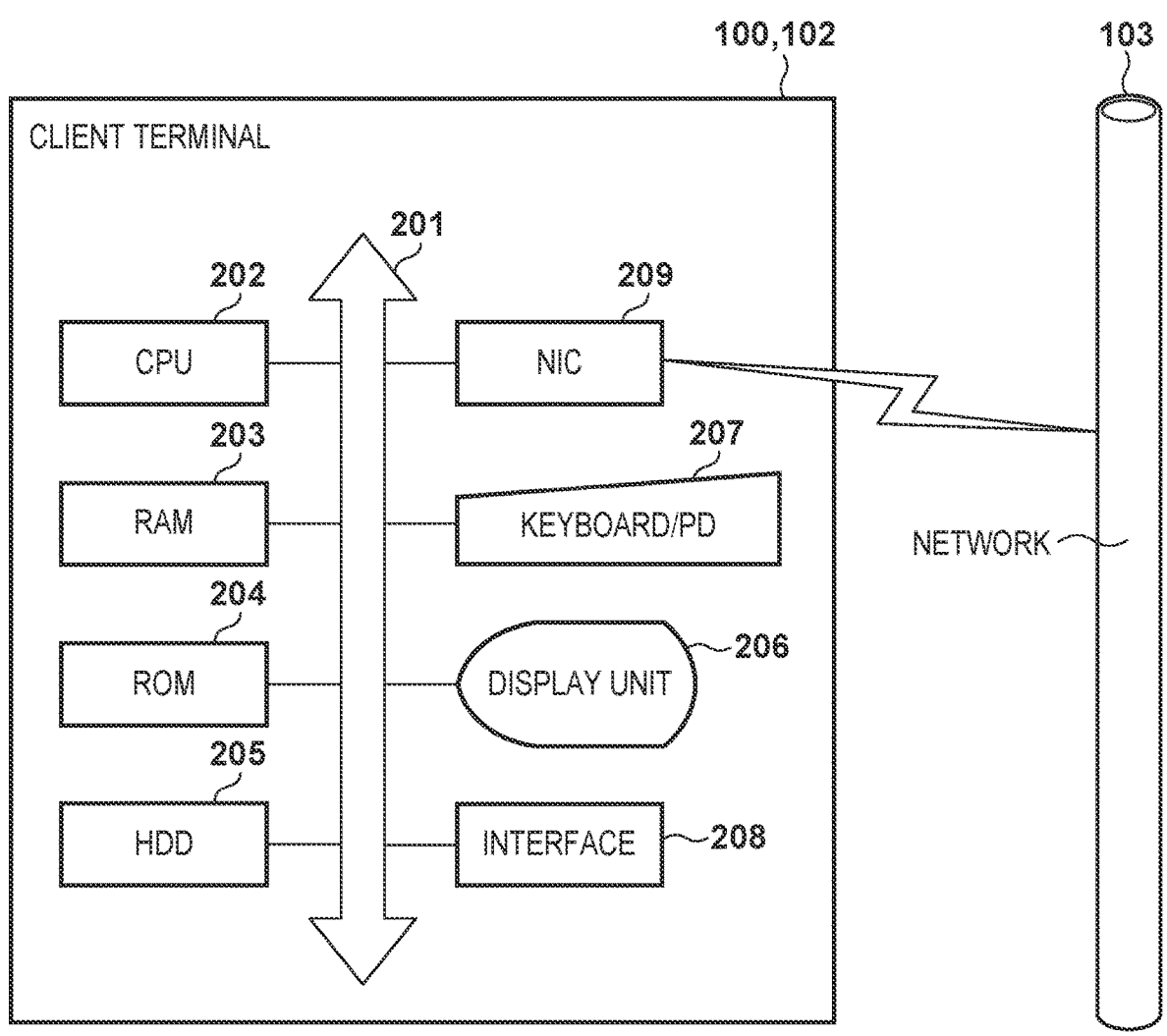
FIG. 2 is a block diagram for explaining the hardware arrangement of each client terminal according to the first embodiment.

FIG. 2 is a block diagram for explaining the hardware arrangement of the client terminal 100 according to the first embodiment. Note that the client terminal 100 will be exemplified here since the client terminal 100 and the client terminal 102 basically have the same hardware arrangement.

A CPU (Central Processing Unit) 202 controls the overall client terminal 100. The CPU 202 deploys an application program, an OS, or the like stored in a hard disk drive (HDD) 205 onto a RAM 203, executes the deployed application program, the OS, or the like, and temporarily stores information, files, and the like required for executing the deployed program in the RAM 203. A ROM 204 stores a boot program and various kinds of data such as a basic I/O program and the like. The RAM 203 functions as the main memory, the work area, and the like of the CPU 202. The HDD 205 functions as a large capacity memory and stores application programs such as office applications, a web browser, and the like, the OS, related programs, and the like. A display unit 206 displays commands and the like input from a keyboard/pointing device (PD) 207. The display unit 206 may also have a touch panel function and perform a part of functions of the keyboard/pointing device (PD) 207. An interface 208 connects a printer, a USB device, and a peripheral device. The keyboard/pointing device (PD) 207 accepts an operation by a user and provides a user interface (UI) together with the display unit 206. A system bus 201 is controls the flow of data in the client terminal 100. A network interface card (NIC) 209 exchanges data with an external apparatus via the LAN 103. Note that the arrangement of the client terminal 100 is merely an example and is not limited to the example of the arrangement shown in FIG. 2. For example, the data and program storage destination can be changed to the ROM 204, the RAM 203, or the HDD 205 in accordance with the characteristic of the data or program to be stored. In this embodiment, unless particularly mentioned, assumed that each kind of processing is implemented by deploying a program stored in the ROM 204 or the like to the RAM 203 or the like, and causing the CPU 202 to execute this deployed program.

Figure 3:
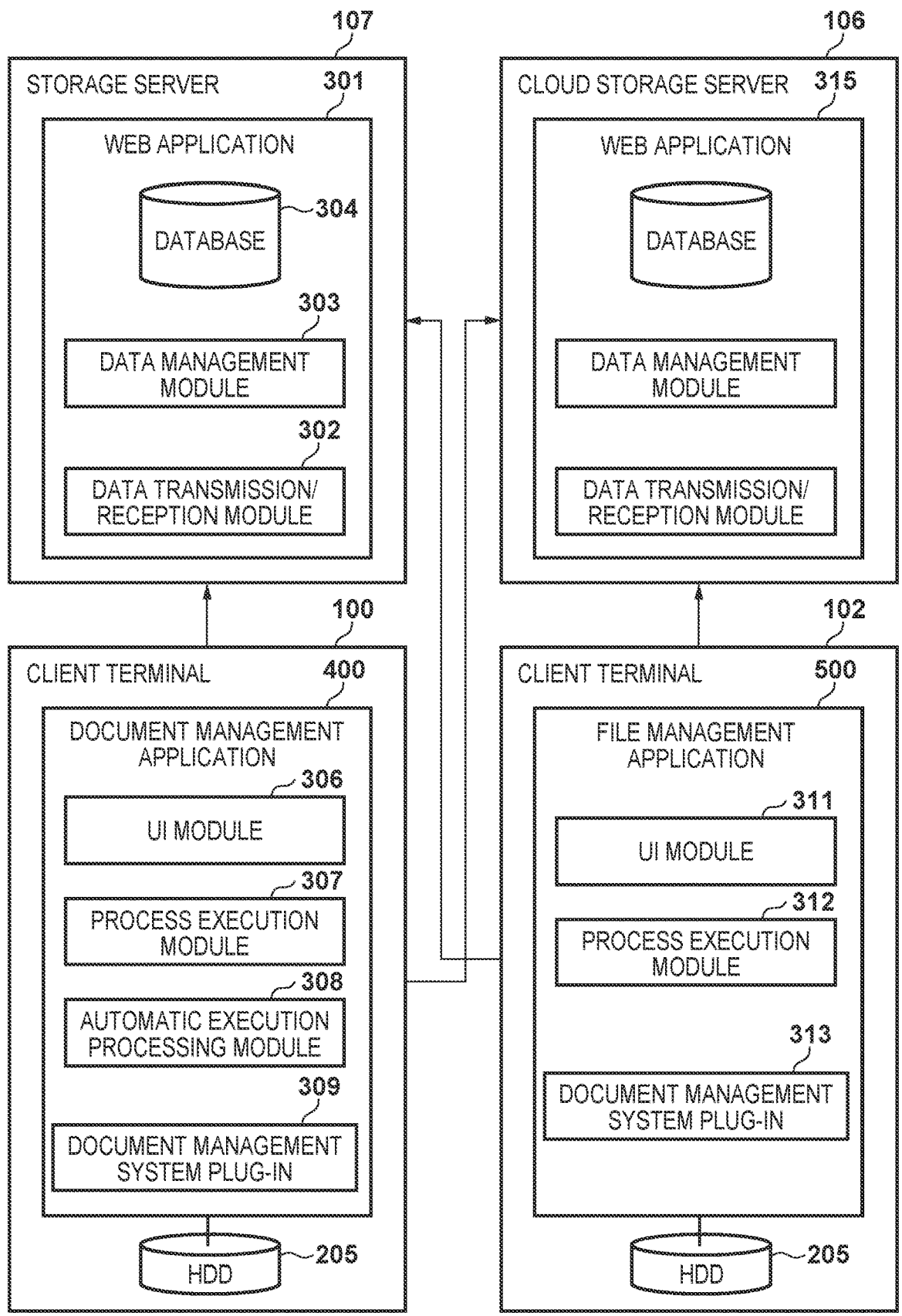
FIG. 3 is a functional block diagram for explaining the software arrangements of the client terminals, a storage server, and a cloud storage server according to the first embodiment.

FIG. 3 is a functional block diagram for explaining the software arrangements of the client terminals 100 and 102, the storage server 107, and the cloud storage server 106 according to the first embodiment.

A web application 301 is stored in the storage server 107 and is a storage application holding a database 304. The web application 301 is software for executing data management in the storage server 107, and executes the work flow in accordance with the requests from the document management application 400 and the file management application 500 of each client terminal (to be described later). A data transmission/reception module 302 receives a request from a document management system plug-in 309 of each client terminal (to be described later) and instructs, in accordance with the contents of the request, a data management module 303 (to be described later) to perform file operation processing. The data management module 303 receives an instruction from the data transmission/reception module 302 and instructs the database 304 to perform the file operation. The database 304 manages the file data. The database 304 may manage files by a flat structure using an index or may manage files by a folder arrangement, and the arrangement of the database is not particularly limited. Note that since a web application 315 of the cloud storage server 106 has a similar software arrangement as that of the web application 301 of the storage server 107, a description will be omitted.

The document management application 400 of each client terminal allows access to the storage server 107 and the cloud storage server 106. The document management application 400 is installed in each of the client terminals 100 and 102, allows access to documents managed by the various kinds of document management systems and the file system of the OS, and can perform various kinds of operations on the document in accordance with a request from the user. A user interface (UI) module 306 constructs a user interface shown in FIG. 4, accepts various kinds of input operations from the user, and instructs a process execution module 307 (to be described later) and an automatic execution processing module 308 (to be described later) to perform corresponding processing operations. The process execution module 307 executes, in accordance with the instruction from the UI module 306, various kinds of operations such as file viewing, file searching, file moving, file copying, and the like. The automatic execution processing module 308 can set an automatic execution setting to a folder based on an input from the user, and perform, based on this setting, automatic execution processing on a file stored in the folder with the automatic execution setting. The document management system plug-in 309 can cooperate with various kinds of document management systems to allow access to a document managed by a document management system, and processes the various kinds of operations executed by the process execution module 307. Note that although omitted in FIG. 3, the document management application 400 is installed in not only the client terminal 100, but also the client terminal 102.

The file management application 500 allows access to the storage server 107 and the cloud storage server 106. The file management application 500 is installed in each of the client terminals 100 and 102, allows access to files managed by the various kinds of document management systems and the file system of the OS, and can perform various kinds of operations on the document in accordance with a request from the user. Compared to the document management application 400, the file management application 500 has a basic file operation function such as file viewing, file searching, file moving, and file copying. However, the file management application 500 differs from the document management application 400 in the point that, for example, an output bar button 405 shown in FIG. 4 and a functional processing module, a UI, and the like corresponding to the automatic execution processing module 308 are not held in an UI module 311 and a process execution module 312. A document management system plug-in 313 has a function similar to the function of the document management system plug-in 309, and allows, in cooperation with the various kinds of document management systems, access to a document managed by a document management system, and processes various kinds of operations executed by the process execution module 312. Note that although omitted in FIG. 3, the file management application 500 is installed in not only the client terminal 102, but also in the client terminal 100.

A UI (user interface) according to the first embodiment will be described next with reference to FIGS. 4 to 7, 9, 11, and 12.

Figure 4:
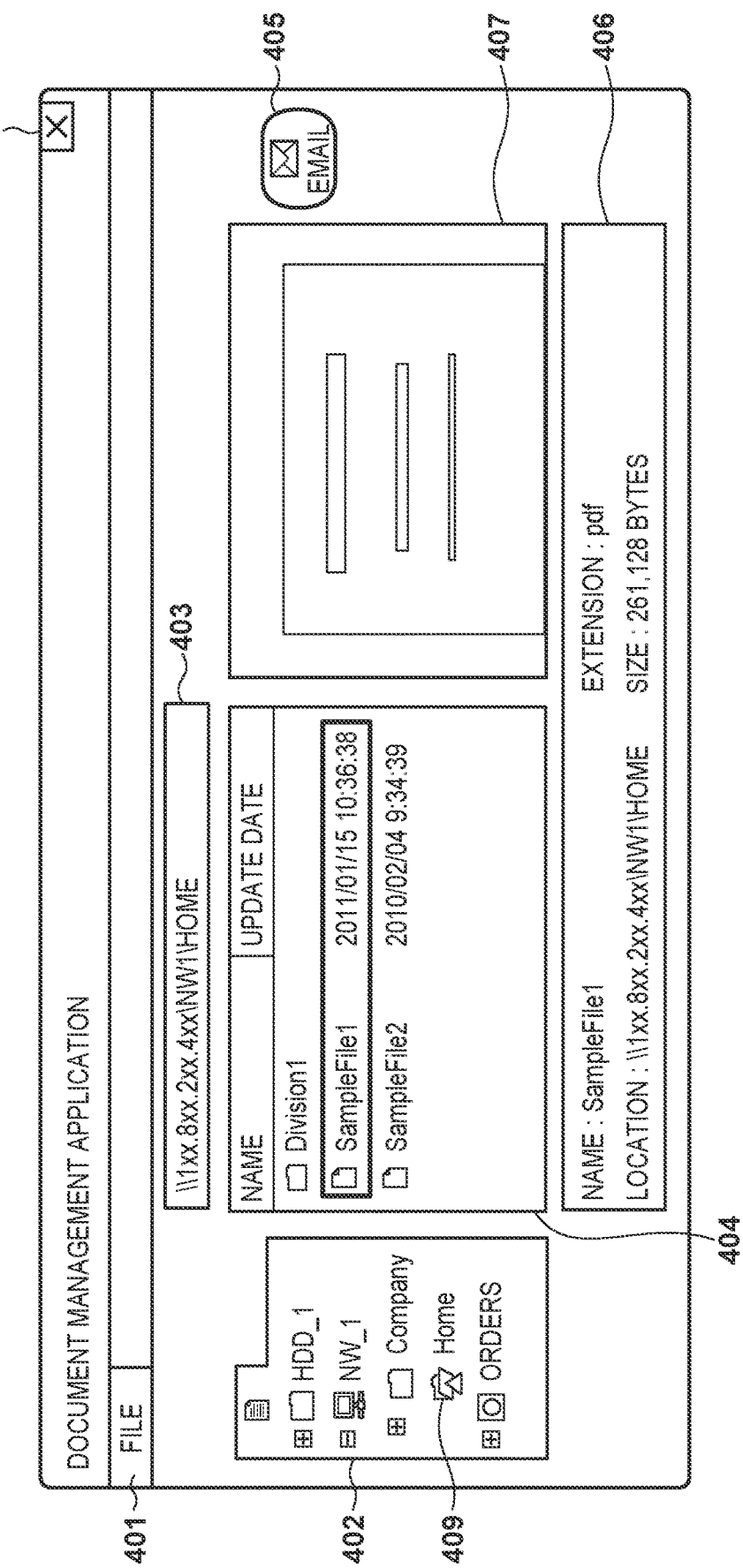
FIG. 4 depicts a view showing an example of a user interface of a document management application according to an embodiment.

FIG. 4 depicts a view showing an example of the user interface of the document management application 400 according to the first embodiment. Note that this document management application 400 is activated as a single application.

FIG. 4 shows a state in which a file menu 401 has been selected and a navigation pane 402 navigates the access to a document management system managed by the document management application 400. On this navigation pane 402, the storage areas of the document management system are displayed in a tree structure and arranged so that each storage area can be accessed in response to the designation by the user. The navigation pane 402 is arranged to be able to integrally display various kinds of document management systems and a physically separate document management system managed by the file system of the OS. An address bar 403 displays the location (path) of the storage area designated by the navigation pane 402. A file list pane 404 displays, in a list, each file or folder stored in the storage area designated on the navigation pane 402. An example in which the document data of files "SampleFile1" and "SampleFile2" in a "Home folder" corresponding to a selected Home icon 409 and a folder "Division1" are displayed is shown in this case.

The output bar button 405 can perform email transmission based on a specific condition when the user selects this button 405 or drags and drops a file on this button. Document information 406 is document information which is displayed when a file displayed on the file list pane 404 is selected. In FIG. 4, the document information of the file "SampleFile1" selected in the file list pane 404 is displayed. This document information 406 includes a file name, a file location (storage location), a size, and an extension and their respective file properties. When a file is selected in the file list pane 404, a preview of the file is displayed in preview display area 407. When a close button 408 is pressed, the screen is closed. The Home icon 409 shows an example of a folder icon with the automatic execution setting. When an automatic execution setting is set to a folder, the folder icon of this folder changes from a normal folder icon to a folder icon with the automatic execution setting. That is, in FIG. 4, a Δ mark has been added to the Home icon 409. As a result, the user can easily recognize which folder is a folder with the automatic execution setting.

Figure 5:
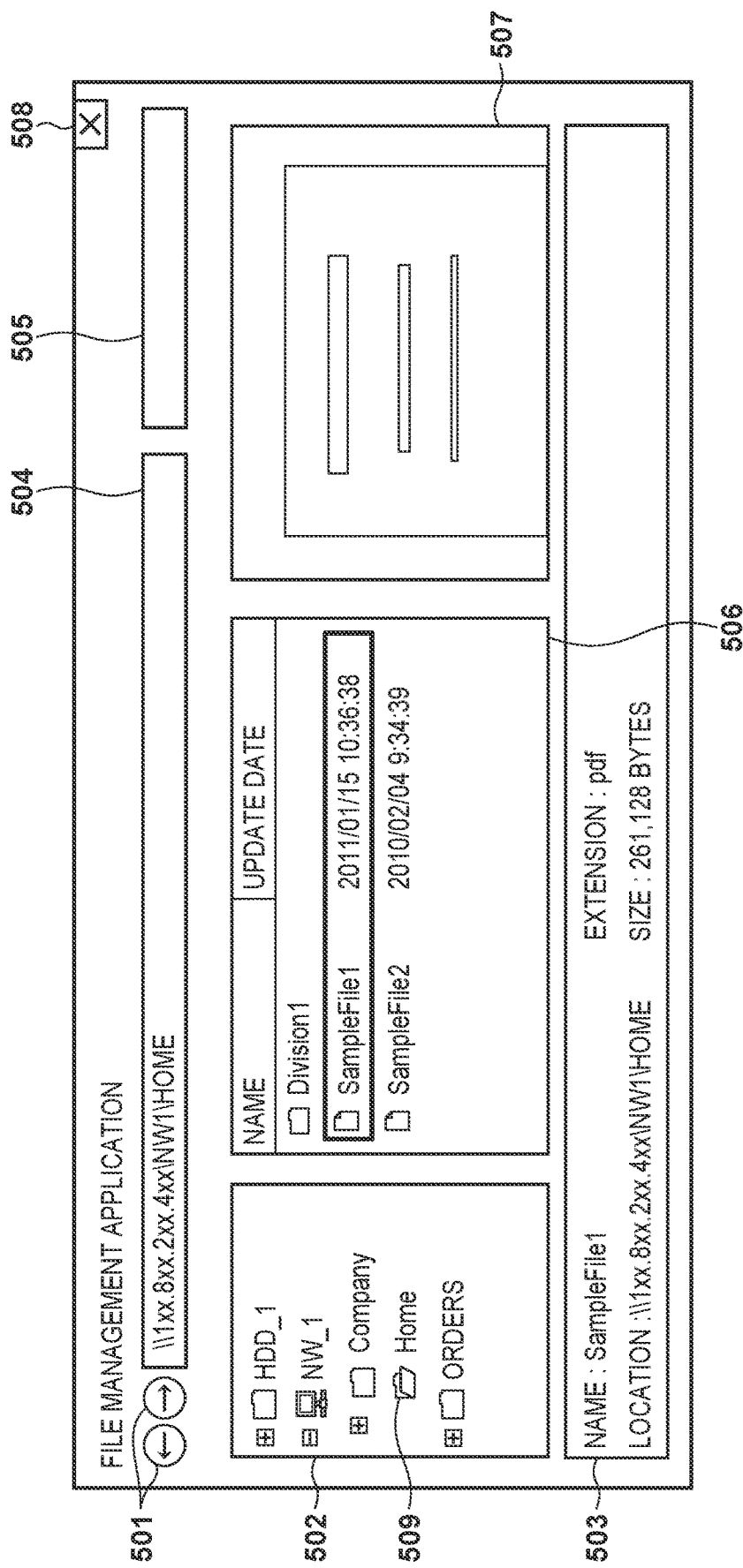
FIG. 5 depicts a view showing an example of a user interface of a file management application.

FIG. 5 depicts a view showing an example of the user interface of the file management application 500. Note that the file management application 500 is activated as a single application.

backward/forward buttons 501 are buttons for respectively making an instruction to return to a previous screen and to proceed to the next screen. A navigation pane 502 navigates the access to a document management system managed by the file management application 500. On the navigation pane 502, the storage areas of the document management system are displayed in a tree structure and arranged so that each storage area can be accessed in response to the designation by the user. The navigation pane 502 is arranged to be able to integrally display various kinds of document management systems and a physically separate document management system managed by the file system of the OS. Document information 503 is document information that is displayed when a file displayed on a file list pane 506 is selected. This document information 503 displays a file name, a file location, a size, an extension, and their respective file properties. An address bar 504 displays the location (path) of the storage area designated on the navigation pane 502. When the user inputs a character string in a search input field 505, a search is executed in accordance with the input character string. The file list pane 506 displays, in a list, each file or folder stored in the storage destination designated on the navigation pane 502. An example in which the document data of the files "SampleFile1" and "SampleFile2" in the selected "Home folder" and the folder "Division1" are displayed is shown in this case. A preview display area 507 displays a preview of a file when the file is selected on the file list pane 506. This screen is closed when a close button 508 is pressed. Although a Home icon 509 indicates a folder to which the automatic execution setting has been set by the document management application 400, this Home icon 509 has an appearance similar to other folder icons in the user interface of this file management application. That is, a Δ mark, as shown in FIG. 4, has not been added. Hence, for example, even if the user has set the automatic execution setting to a folder in the storage server 107 on the document management application 400, this folder will be displayed in the same format as the other folder icons when the user refers to this folder on the user interface of the file management application 500. Therefore, the user will not be able to discriminate that the Home folder is a folder with the automatic execution setting. As a result, the user who is to use the file management application 500 can move a file to the Home folder erroneously without realizing that the automatic execution setting has been set to the Home folder, and an unintended automatic execution operation can occur problematically.

Figure 6:
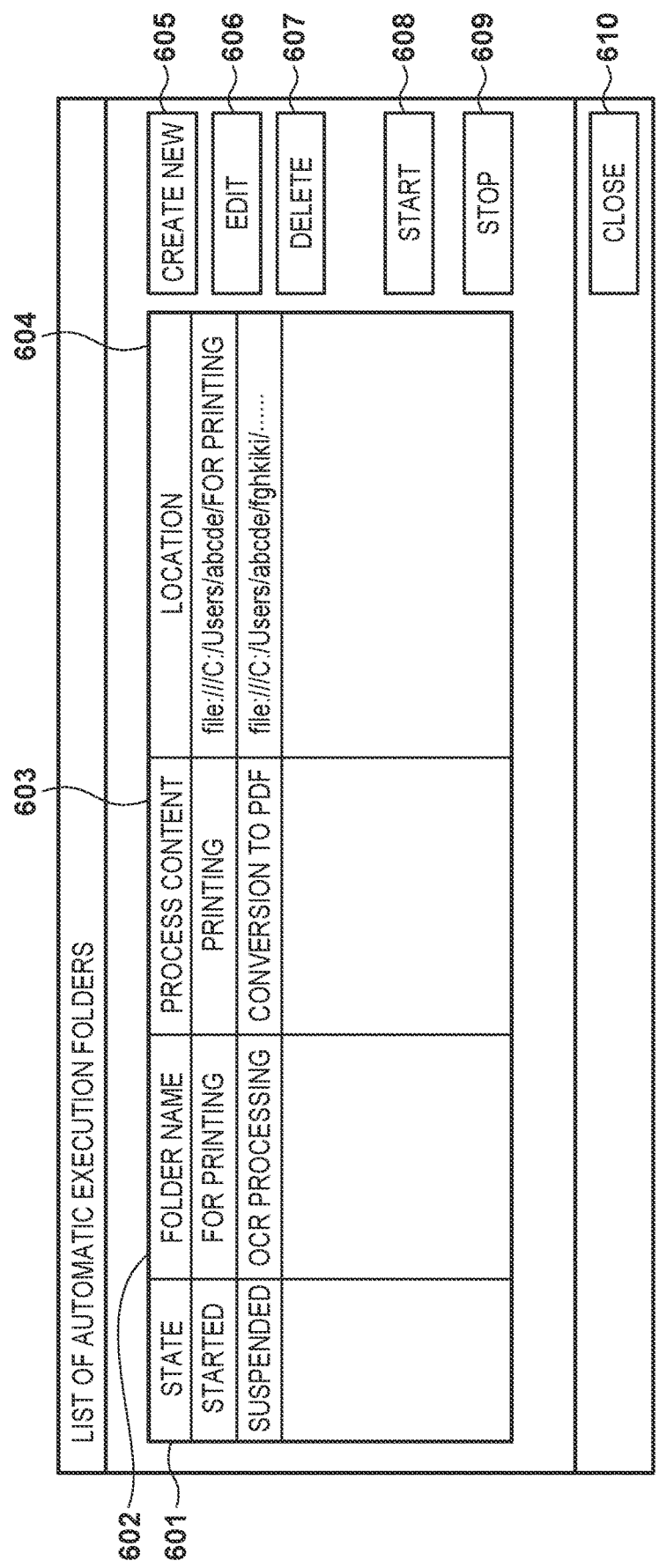
FIG. 6 depicts a view showing an example of an automatic execution folder list to be displayed on a display unit of each client terminal according to the first embodiment.
Figure 7:
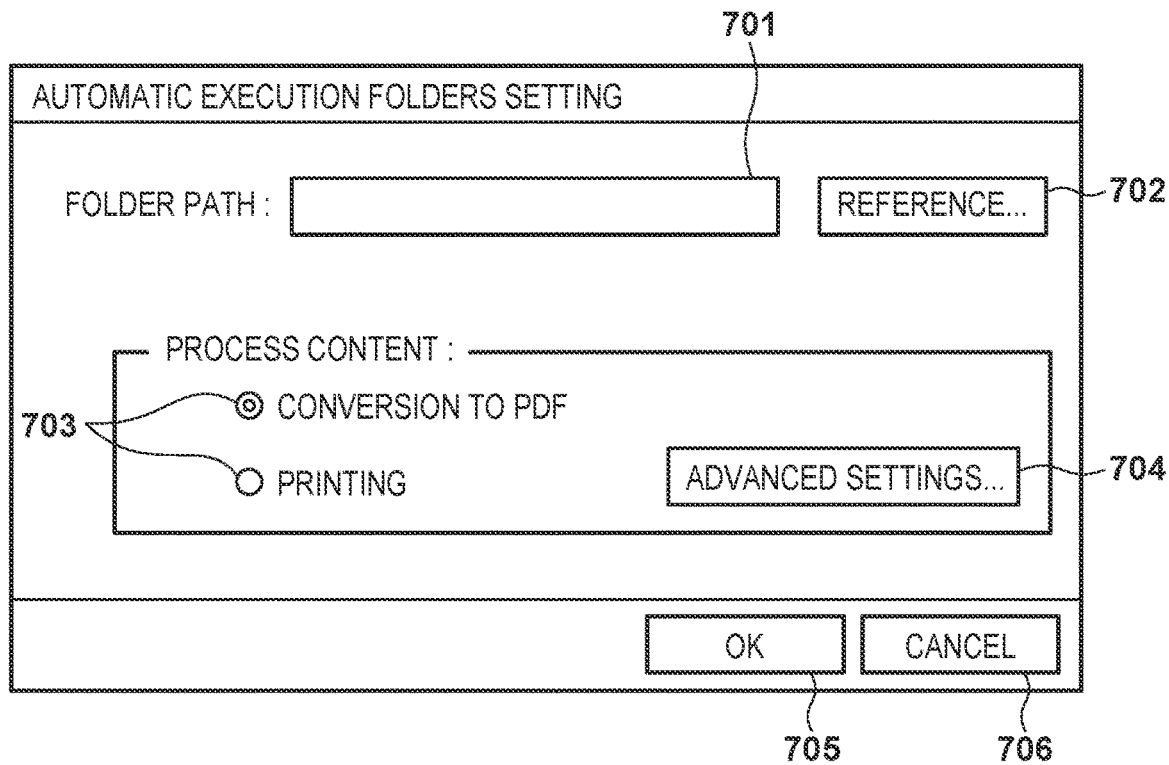
FIG. 7 depicts a view showing an example of an automatic execution folder setting screen to be displayed on the display unit of each client terminal according to the first embodiment.

FIGS. 6, 7, and 9 show examples of user interfaces which are displayed when automatic execution folder setting is to be set on the user interface of the document management application 400. The automatic execution operation can be controlled by setting the settings on these user interfaces.

FIG. 6 depicts a view showing an example of an automatic execution folder list displayed on the display unit 206 of each client terminal according to the first embodiment. This list is displayed when an automatic execution folder setting list on the file menu 401 of the document management application 400 is selected. This list displays various kinds of management items for setting an automatic execution folder and a list of the set automatic execution folder settings.

A column 601 indicates the operation state of each automatic execution folder, and states "started" and "suspended" are displayed in this case. A column 602 indicates the name of each folder set as an automatic execution folder. A column 603 shows the process content to be processed in a corresponding automatic execution folder. In this case, the process content of a folder with the folder name "for printing" is "printing", and the process content of a folder with the folder name "OCR processing" is "conversion to PDF". A column 604 indicates the folder path of a folder designated as an automatic execution folder. In this example, in a folder with the folder name "for printing", it is indicated that the processing state is "started" and the folder path is "file:///C:/Users/abcde/for printing". A newly create button 605 is pressed when newly creating an automatic execution setting. When this newly create button 605 is pressed, an automatic execution folder setting screen of FIG. 7 is displayed.

FIG. 7 depicts a view showing an example of the automatic execution folder setting screen displayed on the display unit 206 of each client terminal according to the first embodiment. This setting screen is a UI for creating an automatic execution setting. By creating an automatic execution setting on this UI, the created automatic execution setting is displayed on the automatic execution folder list of FIG. 6. A refer button 702 is a button for displaying a UI (not shown) for selecting a folder which is to be set with the automatic execution setting. The folder path of the folder selected here will be displayed in an area 701. Radio buttons 703 allow the user to select the process content to be performed for the automatic execution folder. Although PDF conversion processing and printing are displayed as an example of automatic execution processing that can be selected by these radio buttons 703, it may be arranged so that the user can designate an arbitrary processing operation which can be executed by the application, as a matter of course. An advanced setting button 704 is a button for displaying an advanced setting UI (not shown) of the selected process content. When an OK button 705 is pressed, the automatic execution setting set to the folder on this screen is confirmed, and the automatic execution processing module 308 of the document management application 400 stores the data in an automatic execution management table (FIG. 9) stored in the HDD 205. When a cancel button 706 is pressed, the setting set on this screen is entirely canceled, and the screen returns to the automatic execution folder list of FIG. 6.

FIG. 9 depicts a view showing the automatic execution management table held in each client terminal according to the first embodiment.

This automatic execution management table is stored in the HDD 205 by the automatic execution processing module 308 of the document management application 400, and is loaded from the HDD 205 to the RAM 203 by the automatic execution processing module 308 when the document management application 400 is activated. The information managed by this automatic execution management table will be described next.

A column 901 indicates a management ID number (definition ID) of an automatic execution setting. A column 902 indicates the name of the folder set as an automatic execution folder. A column 903 indicates the process content to be processed in the automatic execution folder. Although "conversion to PDF" and "printing" are displayed as examples of process contents here, it may be arranged so that an arbitrary processing operation which can be processed by the document management application 400 can be executed. A column 904 indicates the folder path of a folder designated as an automatic execution folder. A column 905 indicates the setting state of the automatic execution folder. Although the states "started" and "suspended" are shown as examples of setting states here, other arbitrary states may be defined and used.

A more specific example of each column will be described next. In this example, in the first record of the automatic execution management table, an automatic execution folder managed under a definition ID "A000001" has been set, and it is indicated that, as the setting contents of this automatic execution folder, "for printing" and "printing" have been set as the automatic execution target folder name and the process content, respectively. Furthermore, it is indicated that the automatic execution setting has been set to the folder with the folder path "file:///C:/Users/abcde/for printing" and the current processing state is "started".

Next, the description will return to the automatic execution folder list of FIG. 6.

An edit button 606 is a button for editing the setting of the selected automatic execution folder. When the edit button 606 is pressed, the automatic execution folder setting screen of FIG. 7 is displayed in a state in which the setting values of the currently selected automatic execution folder have been input, and the various kinds of setting items can be edited. A delete button 607 is a button for deleting the selected automatic execution folder setting. When a start button 608 is pressed under a state in which the automatic execution folder has been selected, the automatic execution processing of the selected folder can be started. Note that the start button 608 can be pressed only when an automatic execution folder which is in a suspended state is selected. When a suspend button 609 is pressed under a state in which an automatic execution folder has been selected, the automatic execution processing of the selected folder can be suspended. Note that the suspend button 609 can be pressed only when an automatic execution folder which is in a started state is selected. When a close button 610 is pressed, the automatic execution folder list display of FIG. 6 is closed.

The methods for setting, managing the setting values, starting, and ending an automatic execution folder have been described above with reference to FIGS. 6, 7, and 9.

The procedure of automatic execution processing of each client terminal according to the first embodiment will be described next with reference to the flowcharts of FIGS. 11 and 12. More specifically, the processing performed to move or copy a file to an automatic execution folder by executing the document management application 400 in the client terminal 102 will be described with reference to the flowchart of FIG. 12. The automatic execution processing of the document management application 400 in the client terminal 100 will be described next with reference to the flowchart of FIG. 11. The flowcharts will be used to clarify the characteristic processing procedures of file movement processing and automatic execution processing performed in an automatic execution folder by using the document management application 400 in different client terminals.

Figure 12:
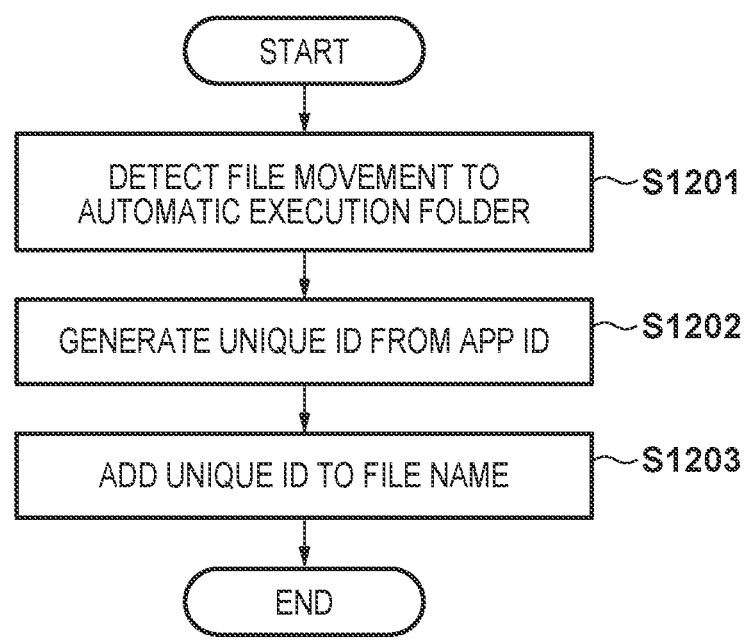
FIG. 12 is a flowchart for explaining processing performed when the document management application moves a file into the automatic execution folder in each client terminal according to the first embodiment.

FIG. 12 is a flowchart for explaining the processing performed when the document management application 400 is to perform moving (including copying) of a file to an automatic execution folder in the client terminal according to the first embodiment. Note that each operation (step) shown in this flowchart is implemented by the CPU 202 of the client terminal 102 executing a program deployed on the RAM 203.

First, in step S1201, when the user moves a file to an automatic execution folder by using the UI module 306 of the document management application 400, the CPU 202 functions as the automatic execution processing module 308 of the document management application 400 and detects the movement of the file in the storage server 107 (or the cloud storage server 106) via the document management system plug-in 309. Next, the process advances to step S1202, and the CPU 202 functions as the automatic execution processing module 308 and generates, based on the app identification information as a unique value of the document management application 400, a unique ID (uniquely specifiable identification information) in the form of a hash value. More specifically, for example, a unique ID "scavat23fae" which is a hash value is generated based on the app identification information called "AbcApp32342". This unique ID is a value that can be recognized by the document management application 400 as an ID for self-specification.

Next the process advances to step S1203, and the CPU 202 adds the unique ID generated in step S1202 to the moved file name. More specifically, for example, in a case in which the source file name is "Sample.pdf", the file name becomes "Sample_scavat23fae.pdf" as a result of the addition of the unique ID to the source file name when the file is stored at the destination. Note that other than the method of adding a unique ID to the file name, the unique ID may be added as a property or an attribute of the file. Alternatively, a control file that can be associated with the moved file on a one-to-one basis may be generated, and the unique ID may be managed by this generated control file.

As described above, according to the first embodiment, in a case in which the user is to use the document management application 400 to move a file to an automatic execution folder, the file name of this file can be changed to a file name to which a unique ID has been added so that, when the automatic execution processing is performed at a subsequent stage, it can be recognized that the file has been moved by using the document management application 400.

Figure 11:
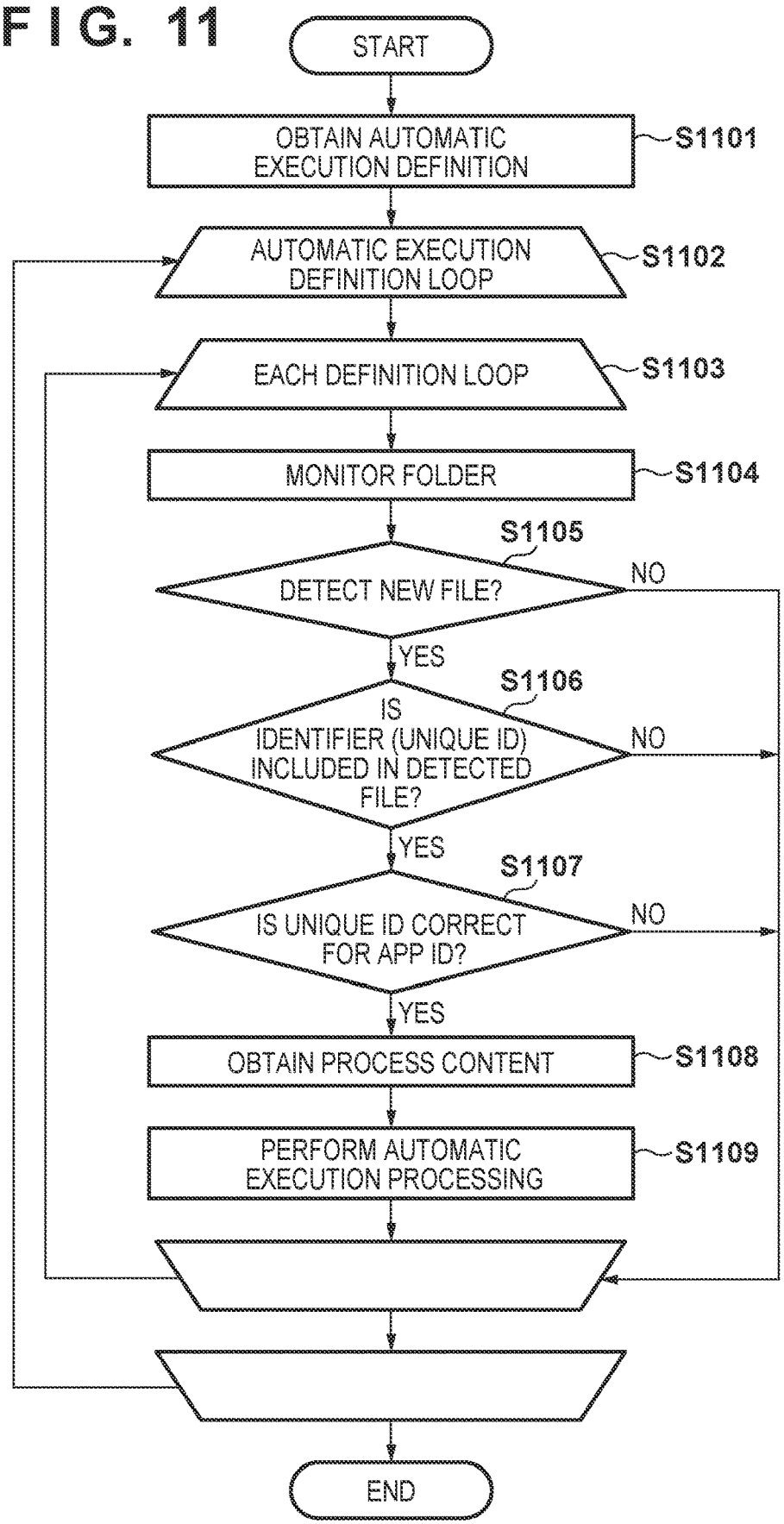
FIG. 11 is a flowchart for explaining automatic execution processing by the document management application in each client terminal according to the first embodiment.

FIG. 11 is a flowchart for explaining the automatic execution processing by the document management application 400 in the client terminal 100 according to the first embodiment. Note that each operation (step) shown in this flowchart is implemented by the CPU 202 of the client terminal 100 executing a program deployed on the RAM 203.

First, in step S1101, the CPU 202 functions as the automatic execution processing module 308 and obtains the automatic execution definition ID from the automatic execution management table (FIG. 9) stored in the HDD 205. Next, the process advances to step S1102, and the CPU 202 starts, based on the obtained automatic execution definition ID, the automatic execution processing corresponding to the number of automatic execution target folders. In step S1103, the CPU 202 functions as the automatic execution processing module 308, and loop processing of monitoring and automatic execution processing to be performed on each automatic execution target folder is performed. This loop processing is performed in a specific time interval and can be controlled by the user by pressing the start button 608 and the suspend button 609 of the automatic execution folder list of FIG. 6. Hence, the processes of steps S1104 to S1109 are processes to be performed in the loop processing of step S1103.

First, in step S1104, the CPU 202 executes folder monitoring processing. Next, in step S1105, the CPU 202 determines whether or not a newly stored file is present in a folder path, which is a folder path in which the automatic execution processing module 308 is designated as an automatic execution folder, of the column 904 (location) of the automatic execution management table (FIG. 9). If the CPU 202 detects a newly stored file, the process advances to step S1106. Otherwise, the process returns to the loop processing of step S1103. In step S1106, the CPU 202 determines whether or not the detected file includes the aforementioned unique ID as an identifier. More specifically, if a file with the file name "Sample_scavat23fae.pdf" is detected in the monitoring target automatic execution folder, the CPU 202 will determine whether the unique ID is included or set in the file name or the property or the attribute value of the file. If it is determined that the unique ID is included or set, the process advances to step S1107. Otherwise, the process returns to the loop processing of step S1103. That is, since a unique ID is not set to the file name or the property of a file in a case in which the file has been moved and stored in an automatic execution folder by an application such as the file management application 500, it can be determined that the unique ID is not included and be set as a file to be excluded as an automatic execution target.

In step S1107, the CPU 202 determines whether or not the unique ID of the obtained file matches the app identification information of the document management application 400. More specifically, if the app identification information of the document management application 400 is "scavat23fae", it will be determined that the unique ID is correct when the detected file name is "Sample_scavat23fae.pdf" described above. If the CPU 202 determines in step S1107 that the unique ID is correct because the unique ID of the file matches the app identification information of the document management application 400, the process advances to step S1108. Otherwise, the process returns to the loop processing of step S1103. In step S1108, the CPU 202 obtains the information of the column 903 (process content) of the automatic execution management table of FIG. 9, and the process advances to step S1109. In step S1109, the CPU 202 performs automatic execution processing of the file based on the obtained process content.

As described above, according to the first embodiment, when a document management application is to store a file in an automatic execution folder, the application adds a unique ID to the file and stores the file. When the document management application is to perform automatic execution processing, it will determine whether or not the file is a file with a unique ID. The application will perform the automatic execution processing if it is determined that the file is a file with the unique ID. As a result, in a case in which a file is erroneously stored in an automatic execution folder by an application, such as a file management application other than the document management application, which cannot recognize the automatic execution folder, the automatic execution processing to be performed on this file can be suppressed.

Second Embodiment

The second embodiment of the present invention will be described next. In the above-described first embodiment, it was set so that a file will not be an automatic execution processing target file unless the file is stored in an automatic execution folder by using a document management application 400. However, among users using both the document management application 400 and a file management application 500, there are users who can recognize which folder is an automatic execution folder. Hence, not being able to use the automatic execution processing in an application other than the document management application 400, such as the file management application 500, will degrade the work efficiency of the user.

Therefore, the second embodiment will describe an example in which the automatic execution processing can be performed from an application other than the document management application 400, such as the file management application 500. Note that since the system arrangement, the hardware arrangement of each terminal and server, and the like according to the second embodiment are similar to those described in the first embodiment above, a description will be omitted.

The second embodiment will describe an UI for setting an automatic execution folder, an automatic execution management table, a flowchart of automatic execution processing, and a file display method by list view with reference to FIGS. 8, 10, 13, and 14.

First, a setting UI and a method of holding a set value according to the second embodiment will be described with reference to FIGS. 8 and 10.

Figure 8:
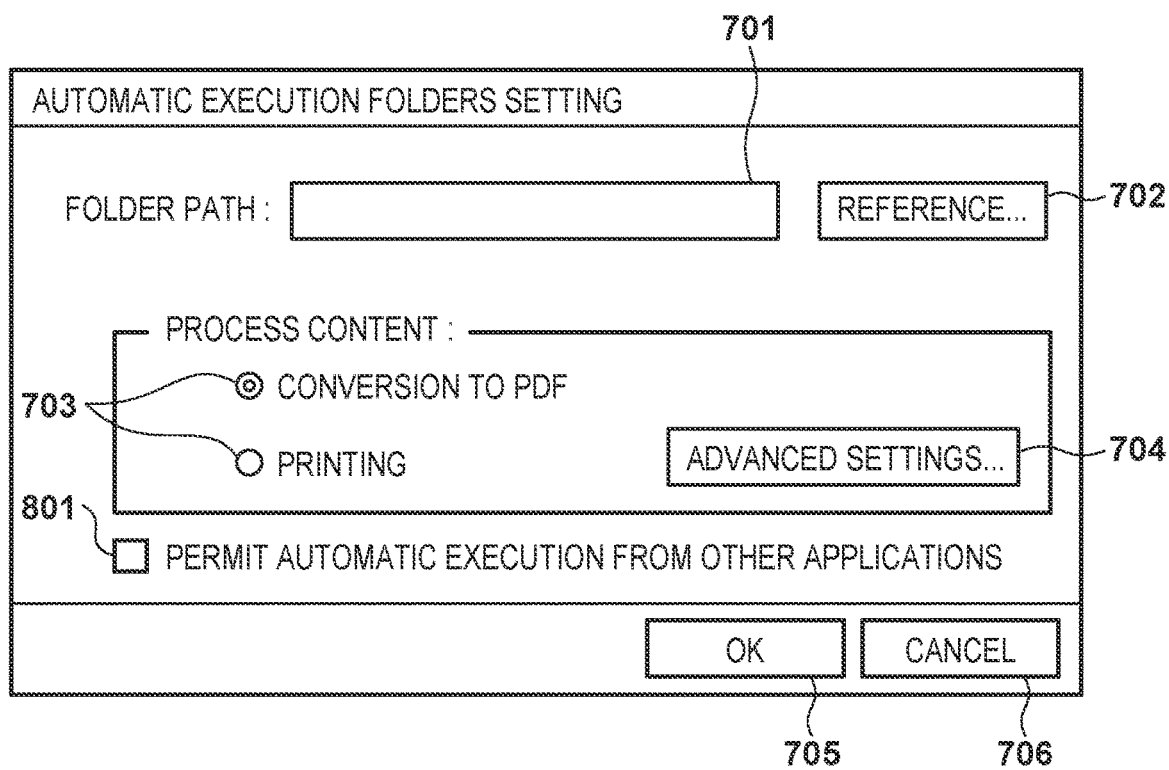
FIG. 8 depicts a view showing an example of an automatic execution folder setting screen to be displayed on a display unit of each client terminal according to the second embodiment.

FIG. 8 depicts a view showing an example of an automatic execution folder setting screen to be displayed on a display unit 206 of each client terminal according to the second embodiment. By creating an automatic execution folder setting on this screen, the created automatic execution folder setting is displayed on the automatic execution folder list of FIG. 6. Note that the same reference numerals denote parts in common with the above-described FIG. 7 in FIG. 8, and a description thereof will be omitted.

A checkbox 801 is a checkbox for allowing an application other than the document management application 400 to execute the automatic execution processing. If the checkbox 801 is checked (set to ON), the automatic execution folder setting is permitted for this other application. On the other hand, if the checkbox 801 is not checked (set to OFF), the automatic execution folder setting is prohibited from being set to an application other than the document management application 400. When an OK button 705 is pressed after the checkbox 801 has been checked, a value "1" is stored in an "execution by other application" column 1001 of the automatic execution management table as shown in FIG. 10.

FIG. 10 depicts a view showing an example of the automatic execution management table held by each client terminal according to the second embodiment. Note that in FIG. 10, the same reference numerals denote parts in common with the above-described FIG. 9, and a description thereof will be omitted.

The column 1001 is a column which stores the setting that indicates whether a file from another application is to be processed as an automatic execution target file when the file is to be stored in an automatic execution folder from this other application. When the value of the column 1001 is "0", the file is not set as an automatic execution target file. When the value is "1", the file is set as an automatic execution target file. In the example of FIG. 10, a folder with the folder name "for printing" is set so as not to be an automatic execution target file, and a folder with the folder name "conversion to PDF" is set to be an automatic execution target file.

The processing of a client terminal 100 according to the second embodiment will be described next with reference to FIGS. 13 and 14.

Figure 13:
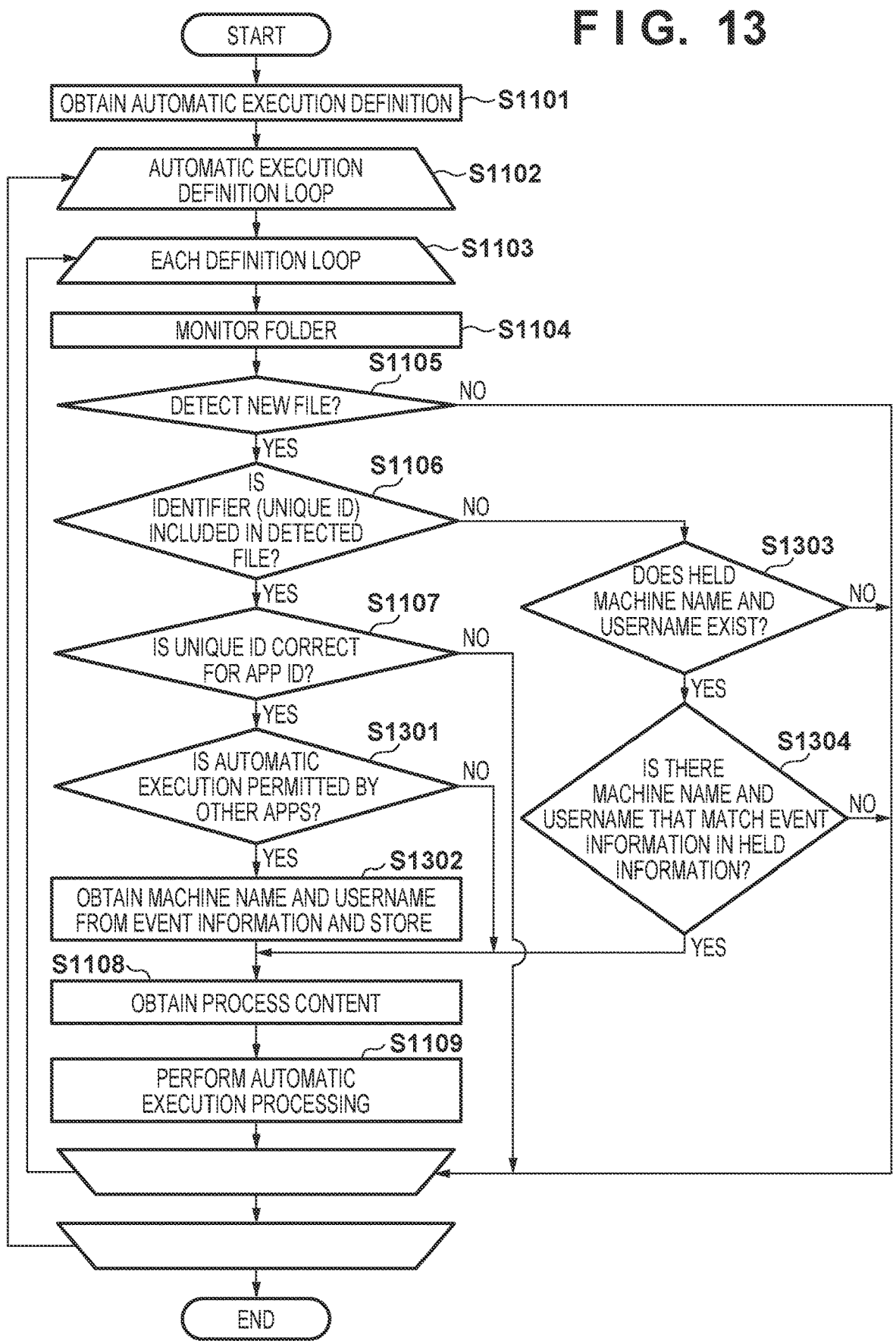
FIG. 13 is a flowchart for explaining automatic execution processing by a document management application in each client terminal according to the second embodiment.

FIG. 13 is a flowchart for explaining the automatic execution processing by the document management application 400 in the client terminal 100 according to the second embodiment. Note that each operation (step) shown in this flowchart is implemented by a CPU 202 of the client terminal 100 executing a program deployed on a RAM 203. Note that in FIG. 13, the same reference numerals denote steps similar to those of the processing of FIG. 11 described above, and a description thereof will be omitted.

When it is determined in step S1107 that the unique ID of a file and the app identification information of the document management application 400 match, the CPU 202 advances the process to step S1301. In step S1301, the CPU 202 obtains the value of the column 1001 ("execution by other application") of the automatic execution management table of FIG. 10 stored in an HDD 205. If the obtained value is 0 ("execution by other application" is set to OFF), the process advances to step S1108. If the "execution by other application" setting is set to ON (the obtained value is 1), the process advances to step S1302. In step S1302, the CPU 202 obtains, from event information, the machine name and the username under which the file is stored, and stores the obtained names together with the information of the target automatic execution folder in a user information management table shown in FIG. 14.

Figures 14, 15:
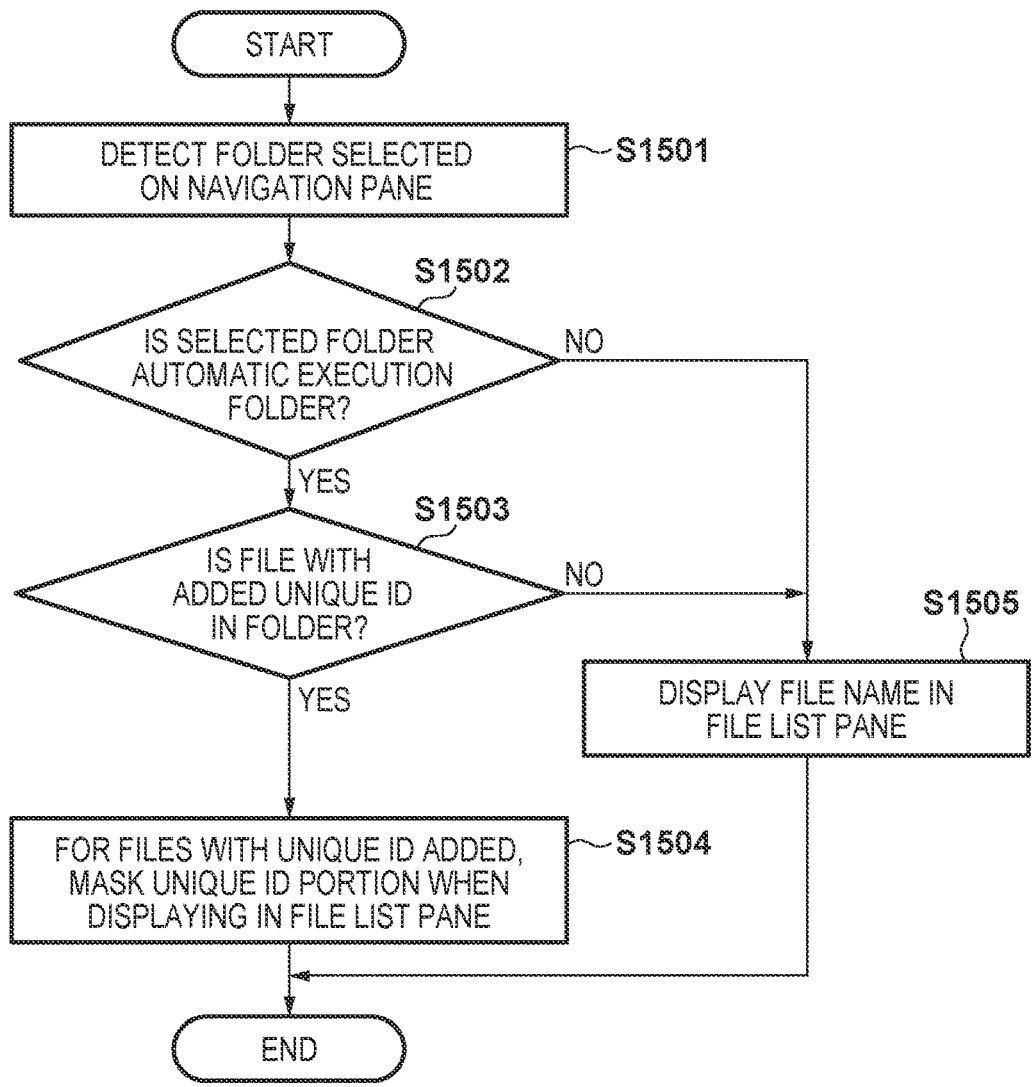
FIG. 14 depicts a view showing an example of a user information management table storing information of a user who has stored a file in the automatic execution folder according to the second embodiment.
FIG. 15 is a flowchart for explaining processing performed when a file is to be displayed on a file list pane of an UI of a document management application in each client terminal according to the third embodiment.

FIG. 14 depicts a view showing an example of the user information management table of the user who stored the file in the automatic execution folder according to the second embodiment. Note that the event information is information issued by the OS when at the time of the operation of a folder, and pieces of information such as the type of operation made on the folder, the operator (user), the operation source machine information, and the like are included in this event information.

A column 1401 is a column for the user ID corresponding to the user at the time of registration and includes unique serial number information. A column 1402 indicates the username. The username of the user who stored the file in the automatic execution folder is registered in this column for the username. A column 1403 indicates the machine name. The machine name of the PC used by the user who stored the file in the automatic execution folder is held in this column for the machine name. A column 1404 indicates the location (folder path) of the automatic execution folder. More specifically, the first record shows that a user with the username "adfa002" has stored a file from a machine with the machine name "xxx.yyy.zzz.111" into an automatic execution folder "file:///C:/Users/abcde/for printing". The description will subsequently return to the flowchart of FIG. 13 next.

In a case that it is determined in step S1106 that a unique ID as an identifier is not included in the detected file, the CPU 202 advances the process to step S1303. In step S1303, the CPU 202 determines that a unique ID is not stored in the file detected in step S1105, that is, a file has been stored from another application. The CPU 202 obtains the automatic execution setting information such as the machine name, the username, and the like from the user information management table of FIG. 14. Subsequently, the CPU 202 determines whether the information related to the automatic execution folder which is being processed is present. If it is determined that the information is not present, the process returns to step S1104. If it is determined that the information is present, the process advances to step S1304. In step S1304, the CPU 202 determines whether the information of the machine name and the username included in the event information is present in the user information management table of FIG. 14. If it is determined that the information is not present, the process returns to step S1104. If it is determined that the information is present, the process advances to step S1108, and the automatic execution processing of this file is executed.

As described above, according to the second embodiment, a file in an automatic execution folder without a unique ID in the file name, the property, or the like can also be set to be processed as an automatic execution target file.

As a result, the automatic execution folder function can be used from an application other than the document management application, and the decrease in the operations to switch the application and the like can effectively improve the work efficiency of the user.

Third Embodiment

The third embodiment of the present invention will be described next. In the above-described first embodiment, when a file is stored in an automatic execution folder by using a document management application 400, a unique ID is added to the file, and the file is stored in the folder in this state. In particular, if the unique ID has been added to the file name, the file name with the added unique ID is displayed on a file list pane 404 of the document management application. Hence, the visibility is degraded for a user because the displayed file name becomes redundant.

Therefore, the third embodiment will describe an example in which the user visibility is improved and the file is displayed in accordance with the expectations of the user by not redundantly displaying the file name even in a state in which the unique ID has been added to the file name. Note that since the system arrangement, the hardware arrangement of each terminal and server, and the like according to the third embodiment are similar to those described in the above first embodiment, a description thereof will be omitted.

FIG. 15 is a flowchart for explaining the processing performed when a file is to be displayed on the file list pane 404 of the document management application 400 in each client terminal according to the third embodiment. Note that each operation (step) shown in this flowchart is executed by a CPU 202 of a client terminal 100 executing a program deployed in a RAM 203.

First, in step S1501, the CPU 202 functions as a process execution module 307 of the document management application 400 and detects a folder selected on a navigation pane 402 when the user clicks, via an UI module 306, on the displayed navigation pane 402 of the document management application. Next, the process advances to step S1502, and the CPU 202 functions as an automatic execution processing module 308 and determines whether the selected folder is an automatic execution folder by comparing the location of the automatic execution folder with the location indicated in a column 904 of an automatic execution management table of FIG. 9. If it is determined that the selected folder is not the automatic execution folder, the process advances to step S1505. The CPU 202 will directly display the file name of the file included in this folder on the file list pane 404 and end the processing.

On the other hand, if the CPU 202 determines in step S1502 that the selected folder is the automatic execution folder, the process advances to step S1503. In step S1503, the CPU 202 functions as the automatic execution processing module 308 and determines whether or not a file with a unique ID is present in the automatic execution folder. If it is determined that a file with a unique ID added to its file name is present, the process advances to step S1504. Otherwise, the process advances to step S1505. In step S1504, the CPU 202 functions as the automatic execution processing module 308 and displays, via the UI module 306, the file name including the unique ID on the file list pane 404 by masking the portion of the unique ID of the file name. More specifically, for example, in a case in which the file name is "Sample_scavat23fae.pdf", the portion "scavat23fae" will be masked since this portion is the unique ID. Subsequently, the file name "Sample.pdf" obtained by masking the portion of the unique ID is displayed on the file list pane 404. Note that this masking of the portion of the unique ID may be performed not only when a file name is to be displayed on the file list pane 404, but also when, for example, a print job name to be referred by the user is to be displayed when the corresponding file is to be printed.

As described above, according to the third embodiment, even in a case in which a unique ID has been added to a file name to suppress automatic execution processing by another application, the portion of the unique ID can be masked when the file name is to be displayed. As a result, it will be possible to prevent the degradation of user visibility, display a file name according to the expectation of the user, and implement an improved/maintained work efficiency.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-184077, filed Oct. 4, 2019, which is hereby incorporated by reference herein in its entirety.

What is claimed is:

1. An information processing apparatus comprising:
at least one memory that stores instructions; and
at least one processor that executes the instructions to perform:
defining a setting for an automatic execution folder, wherein the defined setting includes a process to be executed for a file stored in the automatic execution folder;
determining whether or not a predetermined identifier identifying a predetermined application is added to a filename of a first file stored in the automatic execution folder, wherein the predetermined identifier is added to the filename of the first file by the predetermined application when the predetermined application stores the first file into the automatic execution folder, and wherein the predetermined identifier is different from a filename extension of the first file; and
automatically executing the defined process on the first file stored in the automatic execution folder if it is determined that the filename of the first file includes the predetermined identifier identifying the predetermined application, wherein the defined process is not executed for a second file which filename does not include the predetermined identifier identifying the predetermined application even if the second file is stored in the automatic execution folder.

2. The apparatus according to claim 1, wherein the predetermined identifier is generated by the predetermined application based on a hash value of identification information of the predetermined application.

3. The apparatus according to claim 1, wherein the defined setting includes a path indicating a storage destination of the automatic execution folder and the defined process to be executed for a file stored in the automatic execution folder.

4. The apparatus according to claim 1, wherein the at least one processor executes the instructions to further perform displaying the filename of the file being stored in the automatic execution folder without displaying the predetermined identifier added to the filename of the file by masking the predetermined identifier.

5. A method of controlling an information processing apparatus, the method comprising:
- defining a setting for an automatic execution folder, wherein the defined setting includes a process to be executed for a file stored in the automatic execution folder;
- determining whether or not a predetermined identifier identifying a predetermined application is added to a filename of a first file stored in the automatic execution folder, wherein the predetermined identifier is added to the filename of the first file by the predetermined application when the predetermined application stores the first file into the automatic execution folder, and wherein the predetermined identifier is different from a filename extension of the first file; and
- automatically executing the defined process on the first file stored in the automatic execution folder if it is determined that the filename of the first file includes the predetermined identifier identifying the predetermined application, wherein the defined process is not executed for a second file which filename does not include the predetermined identifier identifying the predetermined application even if the second file is stored in the automatic execution folder.

6. A non-transitory computer-readable storage medium storing a program for causing a processor to execute a method of controlling an information processing apparatus, the method comprising:
- defining a setting for an automatic execution folder, wherein the defined setting includes a process to be executed for a file stored in the automatic execution folder;
- determining whether or not a predetermined identifier identifying a predetermined application is added to a filename of a first file stored in the automatic execution folder, wherein the predetermined identifier is added to the filename of the first file by the predetermined application when the predetermined application stores the first file into the automatic execution folder, and wherein the predetermined identifier is different from a filename extension of the first file; and
- automatically executing the defined process on the first file stored in the automatic execution folder if it is determined that the filename of the first file includes the predetermined identifier identifying the predetermined application, wherein the defined process is not executed for a second file which filename does not include the predetermined identifier identifying the predetermined application even if the second file is stored in the automatic execution folder.

* * * * *